United States Patent
Murase et al.

(10) Patent No.: US 8,248,144 B2
(45) Date of Patent: Aug. 21, 2012

(54) HIGH-FREQUENCY SWITCH MODULE AND HIGH-FREQUENCY SWITCH APPARATUS

(75) Inventors: Hisanori Murase, Nagaokakyo (JP); Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/089,338

(22) Filed: Apr. 19, 2011

(65) Prior Publication Data

US 2011/0193614 A1 Aug. 11, 2011

Related U.S. Application Data

(63) Continuation of application No. PCT/JP2009/067748, filed on Oct. 14, 2009.

(30) Foreign Application Priority Data

Oct. 20, 2008 (JP) .................................. 2008-269642

(51) Int. Cl.
H03L 7/06 (2006.01)
(52) U.S. Cl. ...................................................... 327/419
(58) Field of Classification Search .................. 327/407, 327/415, 419; 455/83, 101; 375/347; 370/339
See application file for complete search history.

(56) References Cited

U.S. PATENT DOCUMENTS

| | | | |
|---|---|---|---|
| 7,019,596 B2 * | 3/2006 | Oita et al. | 331/74 |
| 7,120,204 B2 * | 10/2006 | Matsusaka | 375/302 |
| 7,881,690 B2 * | 2/2011 | Dubois et al. | 455/307 |
| 2002/0090036 A1 * | 7/2002 | Matsusaka | 375/296 |
| 2002/0135430 A1 * | 9/2002 | Oita et al. | 331/74 |
| 2004/0032706 A1 | 2/2004 | Kemmochi et al. | |
| 2004/0171356 A1 | 9/2004 | Uriu et al. | |
| 2007/0238419 A1 * | 10/2007 | Dubois et al. | 455/78 |
| 2009/0117859 A1 * | 5/2009 | Smith et al. | 455/78 |
| 2009/0175383 A1 * | 7/2009 | Cho et al. | 375/316 |

FOREIGN PATENT DOCUMENTS

| | | |
|---|---|---|
| JP | 2002-368646 A | 12/2002 |
| JP | 2004-253953 A | 9/2004 |
| WO | 02/37709 A | 5/2002 |

OTHER PUBLICATIONS

Official Communication issued in International Patent Application No. PCT/JP2009/067748, mailed on Nov. 24, 2009.

* cited by examiner

*Primary Examiner* — Lincoln Donovan
*Assistant Examiner* — Adam Houston
(74) *Attorney, Agent, or Firm* — Keating & Bennett, LLP

(57) ABSTRACT

A high-frequency switch module includes a multi-layer substrate, and a switch circuit mounted on the multi-layer substrate. The multi-layer substrate includes a terminal through which a plurality of high-frequency signals in a plurality of frequency bands are input and output, a plurality of switch terminals, terminals to which control signals to control the switch circuit are supplied, current paths that connect the terminals to the switch circuit, and resistors that are provided on the current paths and have resistance values greater than the resistance values of the current paths. The switch circuit connects the terminal to the switch terminals corresponding to the frequency bands of high-frequency signals input and output through the terminal based on the control signals.

16 Claims, 4 Drawing Sheets

HIGH-FREQUENCY SWITCH MODULE AND HIGH-FREQUENCY SWITCH APPARATUS

BACKGROUND OF THE INVENTION

1. Field of the Invention

The present invention relates to high-frequency switch modules and high-frequency switch apparatuses, and more particularly, to high-frequency switch modules and high-frequency switch apparatuses used in wireless communication apparatuses which can be used in a plurality of different communications systems.

2. Description of the Related Art

Examples of mobile communications systems include GSM 900 (Global System for Mobile Communications 900), GSM 1800 (Global System for Mobile Communications 1800) widely used in Europe, GSM 850 (Global System for Mobile Communications 850) widely used in North America, and PDC (Personal Digital Cellular) system widely used in Japan. Examples of CDMA systems used in parallel with GSM include CDMAOne (Code Division Multiple Access One) and IMT-2000 (International Mobile Telecommunications 200). Recent widespread use of mobile phones has caused a problem in that frequency bands assigned to each of the mobile communications systems are not sufficient for providing services to all of the users of the systems, resulting in interruptions of communications or difficulties in making connections particularly in large city areas. Thus, it has been proposed to allow a user to use a plurality of mobile communications systems thereby substantially increasing the available frequencies, improving service, and enabling efficient use of infrastructures.

Accordingly, an antenna switch circuit disclosed in Japanese Unexamined Patent Application Publication No. 2004-253953 has been disclosed. The antenna switch circuit includes an antenna and a switch circuit. The antenna transmits and receives transmission and reception signals in a plurality of frequency bands. The switch circuit switches transfer paths so as to correctly output the reception signals in a plurality of frequency bands input from the antenna to the corresponding receiver circuits, as well as switches the transfer paths so as to correctly output the transmission signals to the antenna. Such a switch circuit includes a plurality of FET transistors, and the FET transistors, which are switched ON or OFF by control signals, switch transfer paths. The above-described antenna switch circuit enables transmission and reception signals in a plurality of types of frequency band to be handled in mobile phones.

In such an antenna switch circuit, it is necessary to prevent noise generated in a printed circuit substrate on which the antenna switch circuit is mounted from being input to the switch circuit of the antenna switch circuit. Accordingly, a capacitor, one end of which is grounded, is connected to the path through which a signal for controlling the switch circuit is transferred. This enables the noise generated in the printed circuit substrate to be transferred to the ground through the capacitor via a ground electrode within the printed circuit substrate, whereby the noise is prevented from being input to the switch circuit.

However, the above described antenna switch circuit still has a problem in that the high-frequency characteristics of the switch circuit are deteriorated due to noise, as will be described below. FIG. 5 is a cross-sectional view of an antenna switch circuit 100 and a printed circuit substrate 102 on which the antenna switch circuit 100 is mounted. The printed circuit substrate 102 includes the antenna switch circuit 100 and a capacitor 104 mounted thereon. The capacitor 104 is grounded through a ground electrode 106 provided within the printed circuit substrate 102 (it is not illustrated how the ground electrode 106 is grounded). The antenna switch circuit 100 is also grounded through the ground electrode 106.

In the antenna switch circuit 100, noise is also generated in the switch circuit (not illustrated) of the antenna switch circuit 100, in addition to the noise generated in the printed circuit substrate 102. These kinds of noise are transferred to the ground side through the capacitor 104 and the ground electrode 106 within the printed circuit substrate 102. However, as illustrated by an arrow in FIG. 5, a portion of the noise is input to the antenna switch circuit 100 through the ground electrode 106 when the antenna switch circuit 100 is connected to the ground electrode 106. Due to this, the noise is also input to the switch circuit of the antenna switch circuit 100, whereby a transmission signal is modulated by the noise. As a result, the harmonics of the transmission signal are distorted and thereby the high-frequency characteristics of the switch circuit are deteriorated.

SUMMARY OF THE INVENTION

To overcome the problems described above, preferred embodiments of the present invention provide a high-frequency switch apparatus and a high-frequency switch module in which noise is prevented from being input to a switch circuit through a capacitor.

A high-frequency switch module according to a preferred embodiment of the present invention preferably includes a first substrate and a switch circuit mounted on the first substrate. The first substrate preferably includes a common terminal through which a plurality of high-frequency signals in a plurality of frequency bands are input and output, a plurality of switch terminals, a control terminal to which a control signal to control the switch circuit in accordance with frequency band of a high-frequency signal input or output through the common terminal is applied, a current path that connects the control terminal to the switch circuit, and a resistance portion arranged to reduce noise passing through the current path, the resistance portion preferably being provided in series in the current path and having a resistance value greater than a resistance value of the current path. The switch circuit preferably connects the common terminal to the switch terminal based on the control signal.

A high-frequency switch apparatus according to another preferred embodiment of the present invention preferably includes a first substrate, a second substrate on which the first substrate is mounted, and a switch circuit mounted on the first substrate. The first substrate preferably includes a common terminal through which a plurality of high-frequency signals in a plurality of frequency bands are input and output, a plurality of switch terminals, a control terminal to which a control signal to control the switch circuit in accordance with the frequency band of a high-frequency signal input or output through the common terminal is applied. The switch circuit connects the common terminal to the switch terminal based on the control signal. The second substrate preferably includes a current path including one end which is connected to the control terminal, and a resistance portion arranged to reduce noise passing through the current path, the resistance portion preferably being provided in series in the current path and having a resistance value greater than a resistance value of the current path.

According to preferred embodiments of the present invention, noise is prevented from being input to a switch circuit through a capacitor.

DETAILED DESCRIPTION OF THE PREFERRED EMBODIMENTS

Hereinafter, a high-frequency switch module and a high-frequency switch apparatus according to preferred embodiments of the present invention are described.

Figure 1:
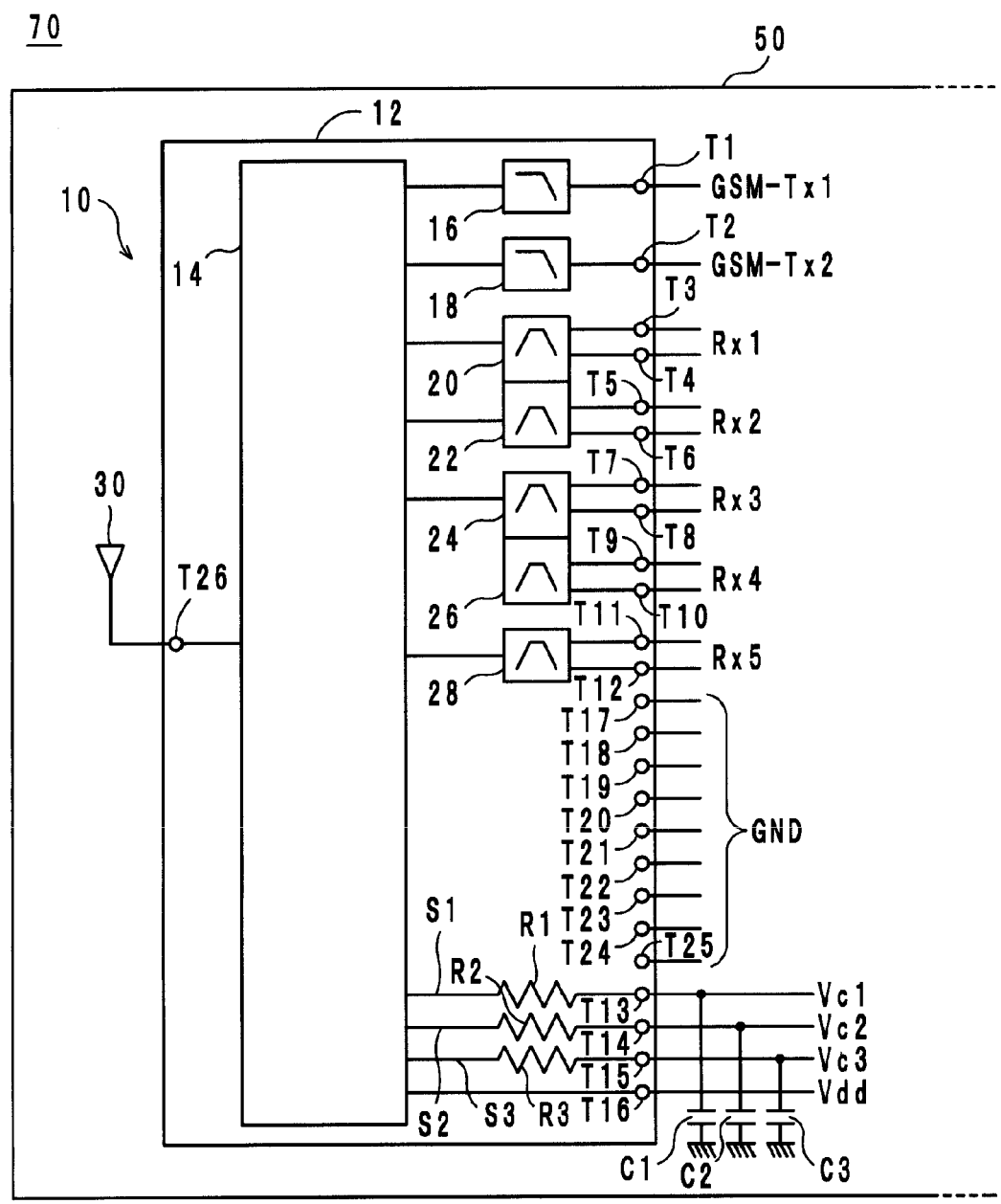
FIG. 1 is a block diagram of a high-frequency switch apparatus including a high-frequency switch module according to a preferred embodiment of the present invention.

Hereinafter, a high-frequency switch module according to a first preferred embodiment of the present invention is described with reference to the drawings. FIG. 1 is a block diagram of a high-frequency switch apparatus 70 including a high-frequency switch module 10. The high-frequency switch apparatus 70 is preferably used in mobile phones that can handle transmission and reception signals in a plurality of types of frequency band, for example. The high-frequency switch apparatus switches transfer paths so as to correctly output the reception signals in a plurality of frequency bands input from the antenna to the corresponding receiver circuits, and switches the transfer paths so as to correctly output the transmission signals to the antenna.

The high-frequency switch apparatus 70 is preferably configured by mounting the high-frequency switch module 10 on a printed circuit substrate 50, as illustrated in FIG. 1. The printed circuit substrate 50 preferably includes an antenna 30 and capacitors C1 to C3 provided thereon. The high-frequency switch module 10 preferably includes a multi-layer substrate 12, a switch circuit 14, SAW filters 20, 22, 24, 26, and 28, resistors R1 to R3, and current paths S1 to S3. Note that the resistors R1 to R3 are respectively connected in series to the current paths S1 to S3, and the SAW filters 20, 22, 24, 26, and 28 include balanced output terminals.

Figure 2A:
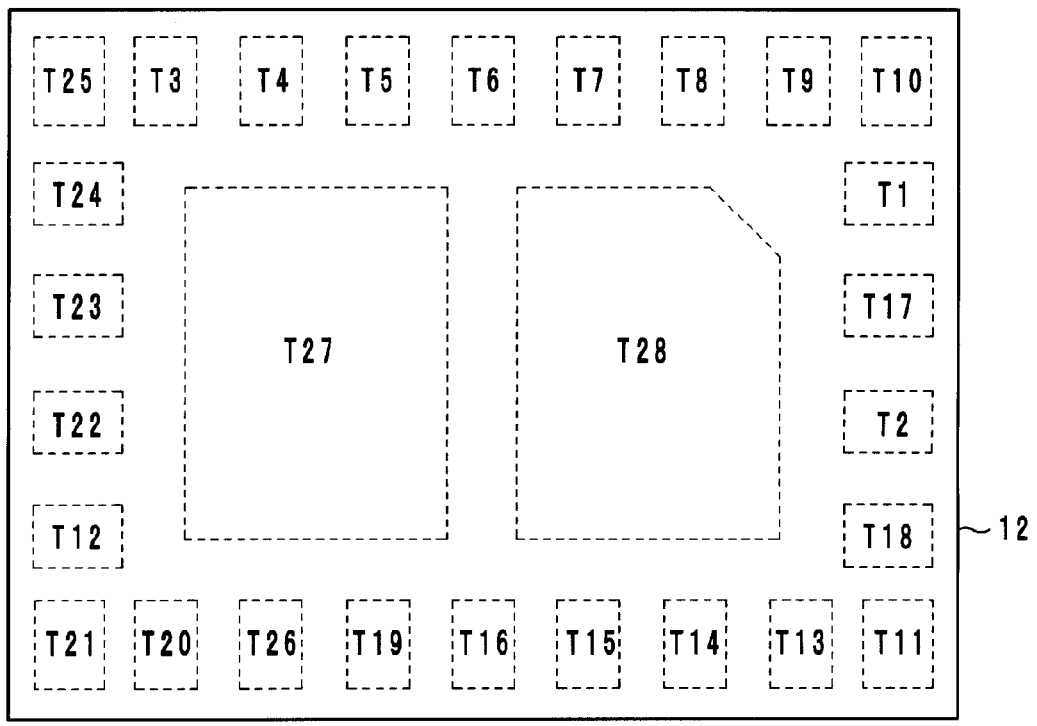
FIG. 2A illustrates the back surface of a multilayer substrate.
Figure 2B:
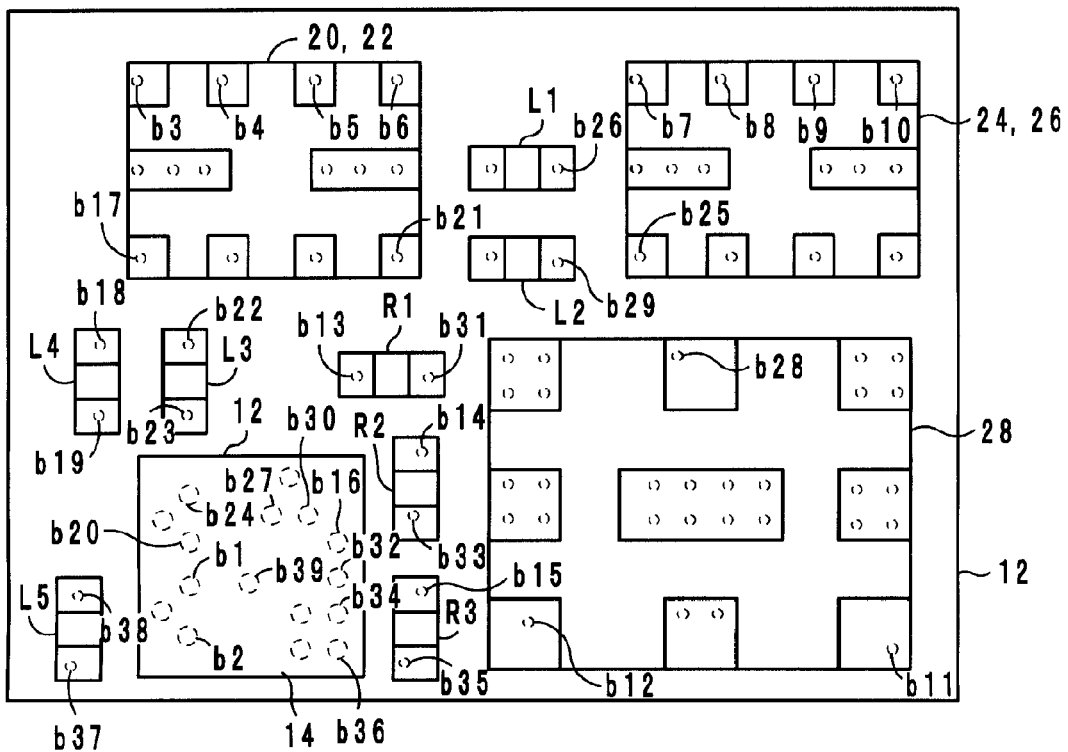
FIG. 2B illustrates the front surface of the multilayer substrate.

The multi-layer substrate 12 is preferably a substrate having a circuit provided therein. FIG. 2A illustrates the back surface of the multi-layer substrate 12, and FIG. 2B illustrates the front surface of the multi-layer substrate 12. The back surface of the multi-layer substrate 12 is a surface that faces the printed circuit substrate 50 when the multi-layer substrate is mounted on the printed circuit substrate 50. The front surface of the multi-layer substrate 12 is a surface that is parallel with the back surface of the multi-layer substrate 12.

As illustrated in FIG. 2A, the back surface of the multi-layer substrate 12 preferably includes terminals T1 to T28 provided thereon. As illustrated in FIG. 1, the terminals T1 and T2 are transmitting terminals to which transmission signals GSM-Tx1 and GSM-Tx2 of a GSM system are respectively input from transmitter circuits (not illustrated). The terminals T3 to T12 are receiving terminals from which reception signals Rx1 to Rx5 of a GSM system are respectively output to receiver circuits (not illustrated). The terminals T13 to T15 are control terminals to which are applied control signals Vc1 to Vc3 to control operation of the switch circuit 14 in accordance with the frequency bands of high-frequency signals input and output through the antenna 30. The terminal T16 is a power terminal to which a power supply voltage Vdd to drive the switch circuit 14 is applied. The terminals T17 to T25 are grounded through a GND terminal (not illustrated). The terminal T26, to which the antenna 30 is connected, is a common terminal through which high-frequency signals in a plurality of frequency bands are input and output. The terminals T27 and T28 in FIG. 2A may be grounded through a GND terminal on the printed circuit substrate 50. The terminals T27 and T28, which have areas greater than those of the terminals T1 to T26, are fixed to electrodes (not illustrated) on the printed circuit substrate 50 side, thereby fixing the printed circuit substrate 50 and the multi-layer substrate 12 in FIG. 1 together.

As illustrated in FIG. 2B, the front surface of the multi-layer substrate 12 preferably includes the switch circuit including a semiconductor such as CMOS, the SAW filters (surface acoustic wave filters) 20, 22, 24, 26, and 28, the resistors R1 to R3, and inductors L1 to L5 mounted thereon. The switch circuit 14, the SAW filters 20, 22, 24, 26, and 28, the resistors R1 to R3, and the inductors L1 to L5 are electrically connected respectively to the terminals T1 to T26 illustrated in FIG. 2A through via hole conductors and wiring provided within the multi-layer substrate 12. Hereinafter, more details are described with reference to FIGS. 2A and 2B. Note that, preferably, the SAW filters 20 and 22 are combined and housed in a single package, and the SAW filters 24 and 26 are combined and housed in a single package. The SAW filters 20, 22, 24, 26, and 28 are filters having a balanced-unbalanced conversion function.

The circles illustrated in FIG. 2B are via hole conductors provided on the uppermost layer of the multi-layer substrate 12. The uppermost layer of the multi-layer substrate 12 includes via hole conductors b1 to b39 provided thereon. The terminals T1 and T2 are electrically connected to the switch circuit 14 respectively through the via hole conductors b1 and b2.

The terminals T3 and T4 are connected to the SAW filter 20 respectively through the via hole conductors b3 and b4. Further, the via hole conductors b3 and b4 are connected to the balanced terminals of the SAW filter 20, and the via hole conductor b17 is connected to the unbalanced terminal of the SAW filter 20. Further, the via hole conductor b17 is electrically connected to the switch circuit 14 through the wiring and the like within the multi-layer substrate 12 and the via hole conductor b20. Thereby, as illustrated in FIG. 1, the switch circuit 14 is electrically connected to the terminals T3 and T4 through the SAW filter 20. In other words, the SAW filter 20 is connected between the switch circuit 14 and the terminals T3 and T4.

The terminals T5 and T6 are connected to the SAW filter 22 respectively through the via hole conductors b5 and b6. Further, the via hole conductors b5 and b6 are connected to the balanced terminals of the SAW filter 22, and the via hole conductor b21 is connected to the unbalanced terminal of the SAW filter 22. Further, the via hole conductor b21 is electrically connected to the switch circuit 14 through the wiring and the like within the multi-layer substrate 12 and the via hole conductor b24. Thereby, as illustrated in FIG. 1, the switch circuit 14 is electrically connected to the terminals T5 and T6 through the SAW filter 22. In other words, the SAW filter 22 is connected between the switch circuit 14 and the terminals T5 and T6.

The terminals T7 and T8 are connected to the SAW filter 24 respectively through the via hole conductors b7 and b8. Further, the via hole conductors b7 and b8 are connected to the balanced terminals of the SAW filter 24, and the via hole conductor b25 is connected to the unbalanced terminal of the SAW filter 24. Further, the via hole conductor b25 is electrically connected to the switch circuit 14 through the wiring and the like within the multi-layer substrate 12 and the via hole conductor b27. Thereby, as illustrated in FIG. 1, the switch circuit 14 is electrically connected to the terminals T7 and T8 through the SAW filter 24. In other words, the SAW filter 24 is connected between the switch circuit 14 and the terminals T7 and T8.

The terminals T9 and T10 are connected to the SAW filter 26 respectively through the via hole conductors b9 and b10. Further, the via hole conductors b9 and b10 are connected to the balanced terminals of the SAW filter 26, and the via hole conductor b25 is connected to the unbalanced terminal of the SAW filter 26. Further, the via hole conductor b25 is electrically connected to the switch circuit 14 through the wiring and the like within the multi-layer substrate 12 and the via hole conductor b27. Thereby, as illustrated in FIG. 1, the switch circuit 14 is electrically connected to the terminals T9 and T10 through the SAW filter 26. In other words, the SAW filter 26 is connected between the switch circuit 14 and the terminals T9 and T10.

The terminals T11 and T12 are connected to the SAW filter 28 respectively through the via hole conductors b11 and b12. Further, the via hole conductors b11 and b12 are connected to the balanced terminals of the SAW filter 28, and the via hole conductor b28 is connected to the unbalanced terminal of the SAW filter 28. Further, the via hole conductor b28 is electrically connected to the switch circuit 14 through the wiring and the like within the multi-layer substrate 12 and the via hole conductor b30. Thereby, as illustrated in FIG. 1, the switch circuit 14 is electrically connected to the terminals T11 and T12 through the SAW filter 28. In other words, the SAW filter 28 is connected between the switch circuit 14 and the terminals T11 and T12.

The terminal T13 is electrically connected to the resistor R1 through the via hole conductor b13. The via hole conductor b13 is electrically connected to the via hole conductor b31 through the resistor R1. The via hole conductor b31 is electrically connected to the switch circuit 14 through the via hole conductor b32. Thereby, as illustrated in FIG. 1, the switch circuit 14 is electrically connected to the terminal T13 through the resistor R1.

The terminal T14 is electrically connected to the resistor R2 through the via hole conductor b14. The via hole conductor b14 is electrically connected to the via hole conductor b33 through the resistor R2. The via hole conductor b33 is electrically connected to the switch circuit 14 through the via hole conductor b34. Thereby, as illustrated in FIG. 1, the switch circuit 14 is electrically connected to the terminal T14 through the resistor R2.

The terminal T15 is electrically connected to the resistor R3 through the via hole conductor b15. The via hole conductor b15 is electrically connected to the via hole conductor b35 through the resistor R3. The via hole conductor b35 is electrically connected to the switch circuit 14 through the via hole conductor b36. Thereby, as illustrated in FIG. 1, the switch circuit 14 is electrically connected to the terminal T15 through the resistor R3.

The terminal T16 is electrically connected to the switch circuit 14 through the via hole conductor b16. The terminals T17 to T25 are ground terminals and are each connected to some of the via hole conductors without reference symbols illustrated in FIG. 2B.

The terminal T26 is electrically connected to the switch circuit 14 through the wiring within the multi-layer substrate 12 and the via hole conductor b39.

A ground electrode covering substantially an entire predetermined layer is provided within the multi-layer substrate 12. Other layers include coil electrodes and capacitors provided thereon. The coil electrodes and the capacitors preferably define low pass filters 16 and 18 illustrated in FIG. 1. The multi-layer substrate 12 includes the low pass filters 16 and 18 connected between the switch circuit 14 and the terminals T1 and T2. Within the multi-layer substrate 12, the via hole conductors and wiring lines that extend between the switch circuit 14 and the terminals T13 to T15 define the current paths S1 to S3.

Next, the capacitors C1 to C3 illustrated in FIG. 1 will be described. The capacitors C1 to C3 are preferably provided on the printed circuit substrate 50, and first ends thereof are connected to wiring lines connected to the terminals T13 to T16 and the second ends thereof are grounded. The first ends of the capacitors C1 to C3 are preferably connected to the wiring lines at positions that are farther from the resistors R1 to R3 than the terminals T13 to T16. The capacitors C1 to C3 enable noise that has arisen in the control signals Vc1 to Vc3 to pass therethrough to the ground side. Note that the capacitors C1 to C3 may be mounted on the multi-layer substrate 12.

In the high-frequency switch module 10 having the configuration described above, the switch circuit 14 connects the terminal T26 to the terminals T3 to T12 corresponding to the frequency bands of the reception signals received by the antenna 30 based on the control signals Vc1 to Vc3. Further, the switch circuit 14 connects the terminal T26 to the terminals T1 and T2 corresponding to the frequency bands of the transmission signals to be transmitted from the antenna 30 based on the control signals Vc1 to Vc3. Accordingly, the high-frequency switch module 10 can handle the transmission and reception signals in a plurality of types of frequency bands.

In the high-frequency switch module 10 having the configuration described above, noise is prevented from being input to the switch circuit 14 through the capacitors C1 to C3, as described below. In more detail, as illustrated in FIGS. 1, 2A, and 2B, the resistors R1 to R3 arranged to attenuate the noise passing through the current paths S1 to S3 are preferably respectively provided on the current paths S1 to S3 that connect the switch circuit 14 to the terminals T13 to T15. The resistors R1 to R3 preferably have resistance values greater than those of the current paths S1 to S3. Thus, compared to when the noise flows through the current paths S1 to S3 on which the resistors R1 to R3 are not provided, more noise is converted to thermal energy and the noise is significantly attenuated when the noise flows through the current paths S1 to S3 on which the resistors R1 to R3 are provided. The capacitors C1 to C3 receive noise that has been attenuated by passing through the resistors R1 to R3. Thus, in the high-frequency switch module 10, the amount of noise input to the switch circuit 14 through the capacitors C1 to C3 and a ground electrode (not illustrated) within the printed circuit substrate 50 is greatly reduced. As a result, in the high-frequency switch module 10, the distortion of the harmonics of transmission signals due to the transmission signals being modulated by noise is prevented, and the deterioration of the high-frequency characteristics of the switch circuit 14 is prevented.

Referring to FIG. 2B, the resistors R1 to R3 are preferably provided along the side of the switch circuit 14 closest to the connection points (i.e., the via hole conductors b32, b34, and b36) between the switch circuit 14 and the current paths S1 to S3. Thereby, the distances between the switch circuit 14 and the resistors R1 to R3 is small and noise is prevented from being input therebetween.

Further, referring to FIG. 2B, the resistors R1 to R3 are preferably provided between the switch circuit 14 and the SAW filter 28. The SAW filter 28 receives the reception signals Rx1 to Rx5 and the switch circuit 14 receives the transmission signals GSM-Tx1 and GSM-Tx2. Thus, by providing the resistors R1 to R3 between the SAW filter 28 and the switch circuit 14, isolation between the reception signals Rx1 to Rx5 and the transmission signals GSM-Tx1 and GSM-Tx2 is improved.

Further, when static electricity is input to the switch circuit 14 through the current paths S1 to S3, the input of the static electricity is effectively controlled by the resistors R1 to R3, thereby preventing the switch circuit 14 from being damaged by the static electricity.

Figure 3A:
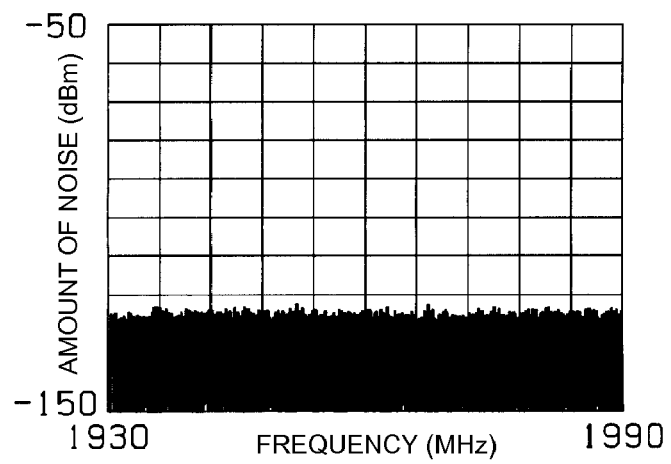
FIG. 3A is a graph illustrating the experiment results of a first exemplary experiment.
Figure 3B:
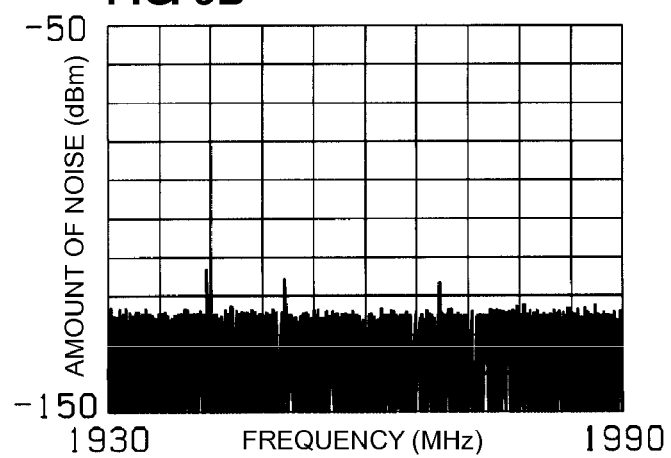
FIG. 3B is a graph illustrating the experiment results of a second exemplary experiment.
Figure 3C:
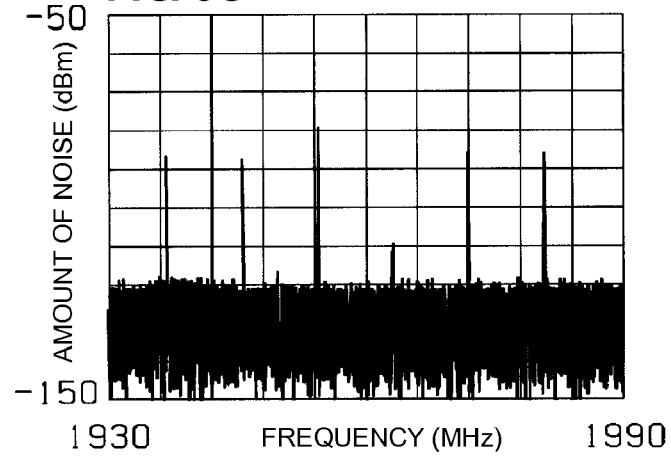
FIG. 3C is a graph illustrating the experiment results of a third exemplary experiment.

The inventors of the present invention performed the experiments described below to further clarify the advantage of the high-frequency switch module 10. Specifically, the high-frequency switch module 10 provided with the resistors R1 to R3 having a resistance value of about 1 kΩ (first exemplary experiment), the high-frequency switch module 10 provided with the resistors R1 to R3 having a resistance value of about 500Ω (second exemplary experiment), and the high-frequency switch module 10 without the resistors R1 to R3 (third exemplary experiment) were prepared and the signals observed at the RF port were examined. FIG. 3A is a graph illustrating the results of the first exemplary experiment; FIG. 3B is a graph illustrating the results of the second exemplary experiment; and FIG. 3C is a graph illustrating the results of the third exemplary experiment. The vertical axis represents the amount of noise and the horizontal axis represents frequency.

As can be seen from the comparison of FIG. 3A to FIG. 3C, the amount of noise is reduced by providing the resistors R1 to R3. Thus, by providing the resistors R1 to R3, noise is prevented from being input to the switch circuit 14 through the capacitors C1 to C3. Further, when comparing FIG. 3A with FIG. 3B, noise is generated, although slightly, in the case of the resistors R1 to R3 having a resistance value of about 500Ω, but noise is negligibly generated in the case of the resistors R1 to R3 having a resistance value of about 1 kΩ. Accordingly, it is preferable that the resistors R1 to R3 have a resistance value of at least about 1 kΩ.

In addition, the inventors of the present application measured the harmonics in the first and third exemplary experiments. The harmonics are observed in a phenomenon in which, when power is applied to a semiconductor at a certain frequency, power is observed at frequencies corresponding to the higher harmonic waves of the frequency. The results show that the harmonics in the third exemplary experiment were about −68 dBc, whereas the harmonics in the first exemplary experiment were about −85 dBc. In other words, the level of the harmonic signals can be reduced to a greater extent in the first exemplary experiment in which the resistors R1 to R3 are provided than in the third exemplary experiment in which the resistors R1 to R3 are not provided. This shows that noise is prevented from penetrating into the switch circuit 14 and thereby modulating the harmonic signals.

Figure 4:
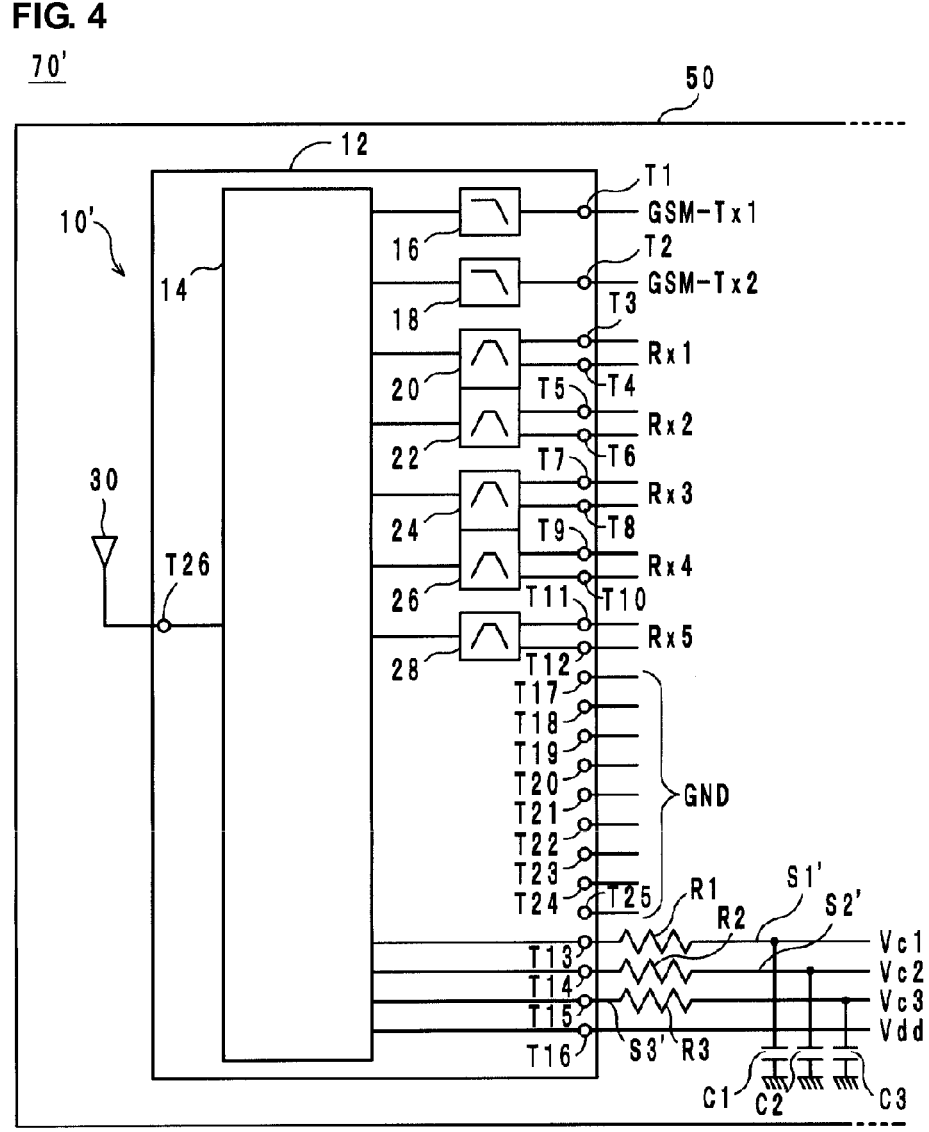
FIG. 4 is a block diagram of a high-frequency switch apparatus according to another preferred embodiment of the present invention.
Figure 5:
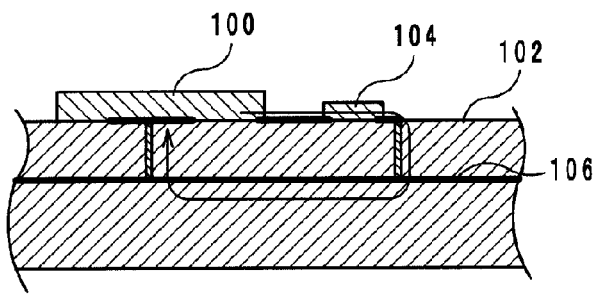
FIG. 5 is a cross-sectional structure diagram of a known antenna switch circuit and a printed circuit substrate on which the antenna switch circuit is mounted.

Hereinafter, a high-frequency switch apparatus according to another preferred embodiment of the present invention is described with reference to the drawings. FIG. 4 is a block diagram of a high-frequency switch apparatus 70'. Hereinafter, a description is provided to describe the differences between the high-frequency switch apparatus 70' and the high-frequency switch apparatus 70 illustrated in FIG. 1.

The high-frequency switch apparatus 70' is different from the high-frequency switch apparatus 70 in terms of the position at which the resistors R1 to R3 provided to reduce noise passing through current paths S1' to S3' are provided. In the high-frequency switch apparatus 70, the resistors R1 to R3 are provided on the multi-layer substrate 12 as illustrated in FIG. 1. On the other hand, in the high-frequency switch apparatus 70', the resistors R1 to R3 are preferably provided on the printed circuit substrate 50 as illustrated in FIG. 4. In more detail, the current paths S1' to S3', first ends of which are respectively connected to the terminals T13 to T15, are provided on the printed circuit substrate 50. The resistors R1 to R3 are provided on the current paths S1' to S3'. In other words, in the high-frequency switch apparatus 70', the resistors R1 to R3 are preferably provided outside of a high-frequency switch module 10'. Further, first ends of the capacitors C1 to C3 are preferably connected to the current paths S1' to S3' at positions which are farther from the resistors R1 to R3 than the terminals T13 to T15, and the second ends are grounded. This configuration prevents noise from being input to the switch circuit 14 through the capacitors C1 to C3.

Note that the remainder of the configuration of the high-frequency switch apparatus 70' is substantially the same as that of the high-frequency switch apparatus 70, and the description thereof is omitted.

In the high-frequency switch apparatus 70', the resistors R1 to R3 are preferably provided in the vicinity of the connection portion of the multi-layer substrate 12 and the printed circuit substrate 50. This enables noise generated from the switch circuit 14 to be removed in the vicinity of the switch circuit 14, and the leakage of the noise to other ports of the switch circuit 14 to be significantly reduced.

Further, the printed circuit substrate 50 includes control terminal electrodes (not illustrated) connected to the second ends of the current paths S1' to S3'. The resistors R1 to R3 may preferably be provided in the vicinity of the control terminal electrodes. This enables a reduction in the leakage of noise from other control terminal electrodes to the control terminal electrodes provided with the resistors R1 to R3.

The high-frequency switch module 10 and the high-frequency switch apparatus 70 are not limited to those described in the preferred embodiments of the present invention, and can be modified within the scope of the present invention. For example, it was assumed that the resistors R1 to R3 are resistor devices and are mounted on the multi-layer substrate 12 or the printed circuit substrate 50. However, resistance portions may be directly provided on the multi-layer substrate 12 or the printed circuit substrate 50, instead of the resistors R1 to R3. In this case, the resistance portions may be defined by wiring lines made of a material that has a resistance greater than that of the current paths S1 to S3, or may be defined by wiring lines having widths less than those of the current paths S1 to S3.

Further, although all of the terminals T13 to T15 are provided with the respective resistors R1 to R3 in the high-frequency switch module 10 and the high-frequency switch apparatus 70, not all of the terminals T13 to T15 need to be provided with the respective resistors R1 to R3. There are cases in which there is no influence of noise even when some of the terminals T13 to T15 are not provided with the respective resistors R1 to R3. In such a case, some of the terminals T13 to T15 not generating noise need not be provided with the respective resistors R1 to R3.

Preferred embodiments of the present invention are useful for a high-frequency switch apparatus and a high-frequency switch module, and are particularly advantageous to prevent noise from being input to a switch circuit through capacitors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency switch module comprising:
a first substrate; and
a switch circuit mounted on the first substrate; wherein
the first substrate includes:
    a common terminal through which a plurality of high-frequency signals in a plurality of frequency bands are input and output;
    a plurality of switch terminals;
    a control terminal to which a control signal to control the switch circuit in accordance with the frequency band of a high-frequency signal input or output through the common terminal is applied;
    a current path arranged to connect the control terminal to the switch circuit; and
    a resistance portion arranged to reduce noise passing through the current path, the resistance portion being provided in series in the current path and having a resistance value greater than a resistance value of the current path; and
the switch circuit is arranged to connect the common terminal to the switch terminal based on the control signal.

2. The high-frequency switch module according to claim 1, wherein the first substrate further includes a capacitor including a first end which is connected to the current path at a position farther from the control terminal than the resistance portion and a second end which is grounded.

3. The high-frequency switch module according to claim 1, wherein the plurality of the switch terminals include a transmitting terminal and a receiving terminal, and the first substrate further includes a low pass filter connected between the transmitting terminal and the switch circuit.

4. The high-frequency switch module according to claim 1, wherein the plurality of the switch terminals include a transmitting terminal and a receiving terminal, and a surface acoustic wave filter is connected between the receiving terminal and the switch circuit.

5. The high-frequency switch module according to claim 4, wherein the resistance portion is arranged between the switch circuit and the surface acoustic wave filter.

6. The high-frequency switch module according to claim 1, wherein the resistance portion is provided along a side of the switch circuit closest to a connection point of the current path and the switch circuit.

7. The high-frequency switch module according to claim 1, wherein the resistance portion has a resistance value greater than or equal to about 1 kΩ.

8. The high-frequency switch module according to claim 1, wherein the switch circuit is a semiconductor switch.

9. A high-frequency switch apparatus comprising:
a first substrate;
a second substrate on which the first substrate is mounted; and
a switch circuit mounted on the first substrate; wherein
the first substrate includes:
    a common terminal through which a plurality of high-frequency signals in a plurality of frequency bands are input and output;
    a plurality of switch terminals; and
    a control terminal to which a control signal to control the switch circuit in accordance with frequency band of a high-frequency signal input or output through the common terminal is applied;
the switch circuit is arranged to connect the common terminal to the switch terminal based on the control signal; and
the second substrate includes:
    a current path including a first end which is connected to the control terminal; and
    a resistance portion arranged to reduce noise passing through the current path, the resistance portion being provided in series in the current path and having a resistance value greater than a resistance value of the current path.

10. The high-frequency switch apparatus according to claim 9, wherein the resistance portion is provided near a connection portion of the first substrate and the second substrate.

11. The high-frequency switch apparatus according to claim 9, wherein the second substrate further includes a control terminal electrode including a first end which is connected to a second end of the current path, and the resistance portion is connected in the vicinity of the control terminal electrode.

12. The high-frequency switch apparatus according to of claim 9, wherein the second substrate further includes a capacitor including a first end which is connected to the current path at a position farther from the control terminal than the resistance portion and a second end which is grounded.

13. The high-frequency switch apparatus according to claim 9, wherein the plurality of the switch terminals include a transmitting terminal and a receiving terminal, and the first substrate further includes a low pass filter connected between the transmitting terminal and the switch circuit.

14. The high-frequency switch apparatus according to claim 9, wherein the plurality of the switch terminals include a transmitting terminal and a receiving terminal, and a surface acoustic wave filter is connected between the receiving terminal and the switch circuit.

15. The high-frequency switch apparatus according to claim 9, wherein the resistance portion has a resistance value greater than or equal to about 1 kΩ.

16. The high-frequency switch apparatus according to claim 9, wherein the switch circuit is a semiconductor switch.

* * * * *